US010446888B2

(12) United States Patent
Rogers

(10) Patent No.: US 10,446,888 B2
(45) Date of Patent: Oct. 15, 2019

(54) BATTERY HEATING ELEMENT

(71) Applicant: Legends, Kenai, AK (US)

(72) Inventor: Richard C Rogers, Kenai, AK (US)

(73) Assignee: Legends, Kenai, AK (US)

( * ) Notice: Subject to any disclaimer, the term of this patent is extended or adjusted under 35 U.S.C. 154(b) by 0 days.

(21) Appl. No.: 14/293,670

(22) Filed: Jun. 2, 2014

(65) Prior Publication Data

US 2014/0356658 A1  Dec. 4, 2014

Related U.S. Application Data

(60) Provisional application No. 61/829,882, filed on May 31, 2013.

(51) Int. Cl.
| | |
|---|---|
| *H01M 10/623* | (2014.01) |
| *H01M 10/615* | (2014.01) |
| *H01M 10/48* | (2006.01) |
| *H01M 10/6571* | (2014.01) |
| *H01M 10/635* | (2014.01) |

(52) U.S. Cl.
CPC ....... *H01M 10/615* (2015.04); *H01M 10/486* (2013.01); *H01M 10/623* (2015.04); *H01M 10/635* (2015.04); *H01M 10/6571* (2015.04); *H01M 2220/30* (2013.01)

(58) Field of Classification Search
CPC .......................... H01M 10/486; H01M 10/615
USPC ............................................. 429/62; 219/201
See application file for complete search history.

(56) References Cited

U.S. PATENT DOCUMENTS

| | | | | |
|---|---|---|---|---|
| 6,876,875 | B2 * | 4/2005 | Shimazaki | H04M 1/0202 379/428.01 |
| 2002/0144677 | A1 * | 10/2002 | MacFarlane | F24J 1/00 126/263.01 |
| 2007/0212597 | A1 * | 9/2007 | Herlinger | H01M 10/615 429/62 |
| 2008/0053979 | A1 * | 3/2008 | Toya | A61F 7/007 219/201 |
| 2011/0273378 | A1 * | 11/2011 | Alameh | H04M 1/72569 345/173 |
| 2013/0210404 | A1 * | 8/2013 | Curtis | H04L 67/34 455/418 |
| 2013/0245973 | A1 * | 9/2013 | Ross, Jr. | G01R 31/3627 702/63 |

FOREIGN PATENT DOCUMENTS

| | | | | |
|---|---|---|---|---|
| CN | 202889442 U | * | 4/2013 | ............ H04M 1/21 |
| DE | 10305494 A1 | * | 8/2004 | ............ H04M 1/18 |

OTHER PUBLICATIONS

Machine translation CN202889442U.*

* cited by examiner

*Primary Examiner* — Stewart A Fraser
*Assistant Examiner* — Victoria H Lynch
(74) *Attorney, Agent, or Firm* — Intellectual Strategies

(57) ABSTRACT

A battery heating system for electronic devices includes a battery that powers an electronic device and a heating element adjacent to the battery. The heating element is configured to emit heat to the battery. The heating element is further configured to be activated by the electronic device. The heating element is further configured to be deactivated by the electronic device. The heating element includes a heat conductive element within a covering.

20 Claims, 5 Drawing Sheets

BATTERY HEATING ELEMENT

CROSS-REFERENCE TO RELATED APPLICATIONS

This application claims the benefit of U.S. Provisional Application No. 61/829,882, filed on May 31, 2013, which is incorporated by reference herein in its entirety.

BACKGROUND

Mobile devices and other electronic equipment that require battery power are sensitive to extreme temperatures. Extreme cold temperatures adversely affect the battery of mobile devices and other electronic equipment, including affecting the battery life or the performance of the battery. People who live, work, and play in cold temperatures need batteries to stay warm and functional. Properly functioning electronic equipment and longer battery life are even more important in extreme cold temperatures as a functioning device may prevent serious injury or death.

SUMMARY

Embodiments of a battery heating system for electronic devices are described. In one embodiment, a battery heating system includes a battery that powers an electronic device and a heating element adjacent to the battery. The heating element is configured to emit heat to the battery. The heating element is further configured to be activated by the electronic device. The heating element is further configured to be deactivated by the electronic device. In some embodiments, the heating element includes a heat conductive element within a covering.

Other embodiments of a battery heating system for electronic devices are also described. In one embodiment, a battery heating system includes an electronic device case and a heating element integrated into the electronic device case. The electronic device case is configured to attach to an electronic device. The heating element is configured to emit heat to a battery of the electronic device and is configured to be activated and deactivated by the electronic device. In some embodiments, the heating element includes a heat conductive element within a covering. Other embodiments of the system are also described.

Embodiments of a method for heating a battery of an electronic device are described. In one embodiment, the method includes monitoring a temperature sensor of a battery of an electronic device, activating a heating element located adjacent to the battery of the electronic device in response to a temperature reading of the temperature sensor below a first predetermined temperature value, and deactivating the heating element in response to a temperature reading above a second predetermined temperature value. The heating element is configured to emit heat to the battery of the electronic device, and the heating element includes a heat conductive element within a covering. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
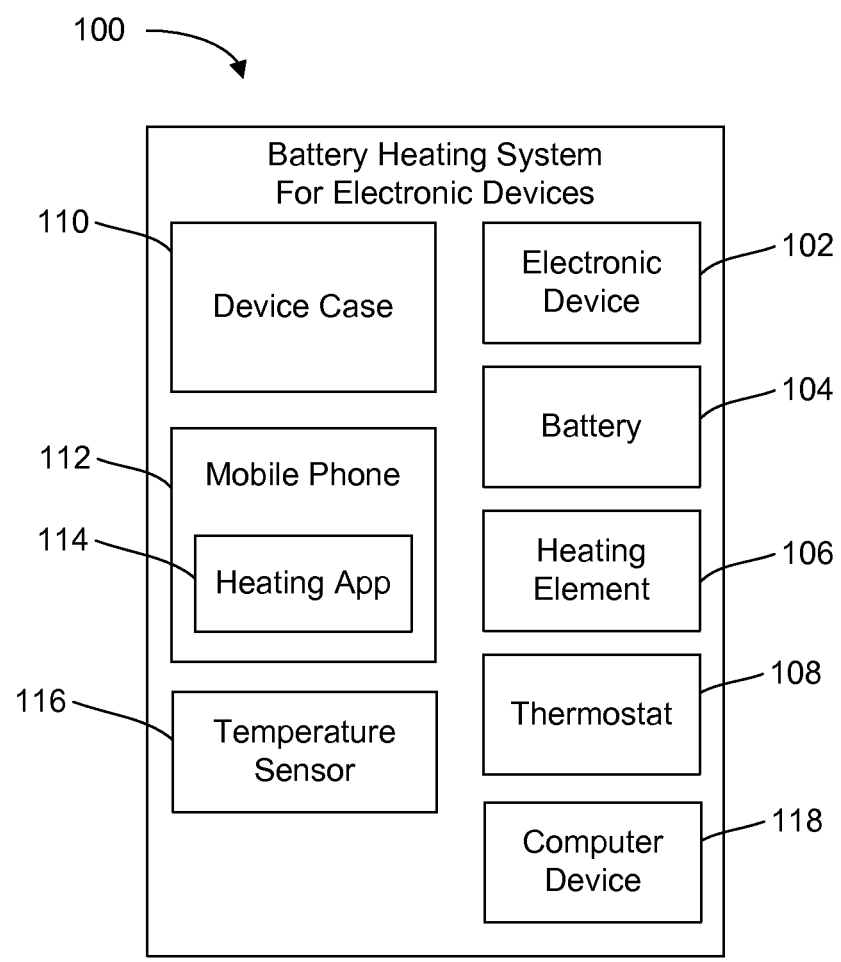
FIG. 1 depicts a schematic diagram of one embodiment of a battery heating system for electronic devices.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate prolonging battery life of electronic devices that are exposed to extreme temperatures. Some embodiments include a heating element attached to or placed near a battery of a mobile device to facilitate maintaining the battery in a desired temperature range in order to prolong the life of the battery. Some embodiments increase user satisfaction and utility of mobile devices as the battery life increases allowing the user more time in remote locations before recharging a battery. In many instances, a properly functioning device may be critical in extreme temperatures. For example, a GPS device, a mobile phone, or another communications device may be critical when the user is lost and exposed to cold temperatures.

Embodiments of a battery heating system for electronic devices are described. In one embodiment, a battery heating system includes a battery that powers an electronic device and a heating element adjacent to the battery. The heating element is configured to emit heat to the battery. The heating element is further configured to be activated by the electronic device. The heating element is further configured to be deactivated by the electronic device. In some embodiments, the heating element includes a heat conductive element within a covering.

The battery may be any battery or device comprising an electrochemical cell that converts chemical energy into electrical energy including but not limited to a rechargeable battery, non-rechargeable battery, an alkaline battery, a lithium-ion battery, a nickel-cadmium battery, or any other type of battery. Additionally, the battery may be of any standard or special size including but not limited to D, C, AA, AAA, LR 44, 9-volt, etc.

In some embodiments, a battery heating system further includes a temperature sensor. The temperature sensor measures a temperature of the battery or the electronic device. In some embodiments, the temperature sensor is located in a position adjacent to the battery of the electronic device. In some embodiments, the temperature sensor is located on the battery of the electronic device. In some embodiments, the temperature sensor is located within the battery of the electronic device. The temperature sensor may be placed or located in a variety of positions to better determine an accurate temperature of the battery of the electronic device. Accurately determining the temperature of the battery and the electronic device may help determine when the heating element should be activated and deactivated. Extreme low temperatures affect the performance of batteries but high temperatures may also degrade performance by unnecessarily draining the battery. In addition, too high of temperatures may damage or overheat other electronic components of the electronic device. The temperature sensor may be any type of temperature sensor that may accurately function in the position on or within the electronic device. The temperature sensor may be, but is not limited to, a thermocouple, a resistive temperature device, a thermistor, an infrared radiator, a bimetallic device, a liquid expansion device, a change-of-state sensor, a silicon diode, or another type of temperature sensor.

In some embodiments, a battery heating system further includes a thermostat or other temperature regulator or control system capable of sensing a temperature of the battery system and maintaining the temperature in a range of acceptable temperature values. In some embodiments, the heating element is configured to be activated in response to a temperature reading of a temperature sensor below a temperature value. In some embodiments, the temperature value is predetermined. In some embodiments, the predetermined temperature value is input by a user and controllable and adjustable by the user. In some embodiments, the heating element is configured to be deactivated or turned off in response to a temperature reading of a temperature sensor above another temperature value, which can be predetermined and set by a user. In this way, a consistent range of acceptable temperatures may be maintained to provide optimum performance of the battery by prolonging battery life in extreme temperatures.

In some embodiments, the battery heating system further includes a computer device. In some embodiments, the heating element includes a computer device. In some embodiments, the computer device is part of the electronic device. In some embodiments, the computer device is separate from the heating element and the electronic device. In some embodiments, the computer device executes an application that determines the temperature values. In some embodiments, the computer device activates and/or deactivates the heating element. In some embodiments, the computer device activates and/or deactivates the heating element in response to an input by a user. In some embodiments, the computer device activates and/or deactivates the heating element in response to a particular temperature reading. In some embodiments, the computer device activates and/or deactivates the heating element in response to a signal from the electronic device, which signal may be communicated wirelessly or by another manner.

In some embodiments, the heating element is connected to the battery of the electronic device and is powered by the battery. In some embodiments the heating element is integrated into the electronic device and functions with and is powered by the battery of the electronic device. In some embodiments, the heating element is powered by a separate power source. In some embodiments, the heating element is powered by a separate battery. In some embodiments, the separate battery of the heating element is configured to charge in conjunction with the charging of the battery of the electronic device. In this way, when a user plugs in the electronic device to charge the battery, the separate battery may be simultaneously charged during the charge of the electronic device battery.

In some embodiments, the heating element may be various sizes and shapes. The size and shape may vary to better fit or function for a particular size battery. In some embodiments, the heating element may be substantially the same size and/or shape as a footprint of the battery of the electronic device. In some embodiments, the heating element is approximately the size of the area of the battery of the electronic device. By sizing the heating element to an approximate of the size of the area of the battery the heating element may better heat all portions of the battery when the heating element is activated rather than heating a specific portion of the battery. In some embodiments, the heating element may be sized to heat a specific portion of the battery. As the battery of different electronic devices can vary greatly the heating element may be an average size or other size that is likely to fit or function properly for a large number distinct electronic devices.

In some embodiments, the heating element includes a heat conductive element. In some embodiments, the heat conductive element is placed within a covering. In some embodiments, the heat conductive element is placed between one or more fabrics. The covering or fabrics may be heat resistant or otherwise configured to distribute the heat generated by the heat conductive element. By distributing the heat more generally over the area of the heating element, the heating element may better heat the battery of the electronic device without any localized extreme heat, which could possible damage the battery of the electronic device. In some embodiments, the heat conductive element may be a wire that produces heat. In one example, the heat conductive element may be a resistance wire that resists the flow of electricity and converts the electrical energy into heat.

In some embodiments, the heating element is configured to attach to the electronic device in a location proximate to the location of the battery of the electronic device. In some embodiments, the heating element is integrated into the electronic device. In some embodiments, the heating element is integrated into an electronic device case. The electronic device case is configured to attach to the electronic device. In one example, the electronic device may be a mobile phone with a screen on the front side of the phone. The battery of the phone is located at a position on the back of the phone. The heating element may be integrated into a phone case for the particular phone, such as a protective case that is also designed to protect the phone from impacts and other destructive forces. The heating element may be placed at a position on the case that would correspond to the location of the battery on the phone. As the case is attached to the phone the heating element is positioned to emit and transfer heat to the battery of the phone. The case and/or heating element may further be connected to the phone through an existing port on the phone, and thereby the phone through an application (such as a downloadable app) may monitor, control, and/or manage the heating element and/or settings of the heating element or a computer device on the heating element. In this way, the heating element can be accurately controlled by a user of the phone and configured to function differently depending on the location of the phone.

The electronic device may be a phone, tablet or other handheld computing device, global positioning system (GPS) device, camera, surveying equipment, recording equipment, or other similar mobile device that is powered, at least partially, by a battery within the electronic device. The electronic device may include software and/or hardware that enables a user to manipulate, manage, monitor, or otherwise control the heating element and/or the heating element's settings.

Other embodiments of a battery heating system for electronic devices are described. In one embodiment, a battery heating system includes an electronic device case and a heating element integrated into the electronic device case. The electronic device case is configured to attach to an electronic device. The heating element is configured to emit heat to a battery of the electronic device and is configured to be activated and deactivated by the electronic device. The heating element includes a heat conductive element within a covering.

In some embodiments, a battery heating system further includes a temperature sensor. The temperature sensor measures a temperature of the battery or the electronic device. In some embodiments, the temperature sensor is located on the electronic device case in a position that will be next to the electronic device battery when the electronic device case is attached to the electronic device. In some embodiments, the temperature sensor is located in a position adjacent to the battery of the electronic device. In some embodiments, the temperature sensor is located on the battery of the electronic device. In some embodiments, the temperature sensor is located within the battery of the electronic device. The temperature sensor may be placed or located in a variety of positions to better determine an accurate temperature of the battery of the electronic device. Accurately determining the temperature of the battery and the electronic device may help determine when the heating element should be activated and deactivated. Extreme low temperatures affect the performance of batteries but high temperatures may also degrade performance by unnecessarily draining the battery. In addition, too high of temperatures may damage or overheat other electronic components of the electronic device. The temperature sensor may be any type of temperature sensor that may accurately function in the position on, next to, or within the electronic device. The temperature sensor may be, but is not limited to, a thermocouple, a resistive temperature device, a thermistor, an infrared radiator, a bimetallic device, a liquid expansion device, a change-of-state sensor, a silicon diode, or another type of temperature sensor.

In some embodiments, a battery heating system further includes a thermostat or other temperature regulator or control system capable of sensing a temperature of the battery system and maintaining the temperature in a range of acceptable temperature values. In some embodiments, the heating element is configured to be activated in response to a temperature reading of a temperature sensor below a temperature value. In some embodiments, the temperature value is predetermined. In some embodiments, the predetermined temperature value is input by a user and controllable and adjustable by the user. In some embodiments, the heating element is configured to be deactivated or turned off in response to a temperature reading of a temperature sensor above another temperature value, which can be predetermined and set by a user. In this way, a consistent range of acceptable temperatures may be maintained to provide optimum performance of the battery by prolonging battery life in extreme temperatures.

In some embodiments, the battery heating system further includes a computer device. In some embodiments, the heating element includes a computer device. In some embodiments, the computer device is part of the electronic device case. In some embodiments, the computer device is part of the electronic device. In some embodiments, the computer device is separate from the heating element and the electronic device. In some embodiments, the computer device executes an application that determines the temperature values. In some embodiments, the computer device activates and/or deactivates the heating element. In some embodiments, the computer device activates and/or deactivates the heating element in response to an input by a user. In some embodiments, the computer device activates and/or deactivates the heating element in response to a particular temperature reading. In some embodiments, the computer device activates and/or deactivates the heating element in response to a signal from the electronic device, which signal may be communicated wirelessly or by another manner.

In some embodiments, the heating element is connected to the battery of the electronic device and is powered by the battery. In some embodiments the heating element is integrated into the electronic device and functions with and is powered by the battery of the electronic device. In some embodiments, the heating element is powered by a separate power source. In some embodiments, the heating element is powered by a separate battery. In some embodiments, the separate battery of the heating element is configured to charge in conjunction with the charging of the battery of the electronic device. In this way, when a user plugs in the electronic device to charge the battery, the separate battery may be simultaneously charged during the charge of the electronic device battery. In some embodiments, the separate battery may be charged separately and may be charged with the electronic device case and may power other features of the electronic device case. In some embodiments, the separate battery may be a non-rechargeable battery and may be a type of button battery or other size battery.

In some embodiments, the heating element may be various sizes and shapes. The size and shape may vary to better fit or function for a particular size battery. In some embodiments, the heating element may be substantially the same size and/or shape as a footprint of the battery of the electronic device. In some embodiments, the heating element is approximately the size of the area of the battery of the electronic device. By sizing the heating element to an approximate of the size of the area of the battery the heating element may better heat all portions of the battery when the heating element is activated rather than heating a specific portion of the battery. In some embodiments, the heating element may be sized to heat a specific portion of the battery. As the battery of different electronic devices can vary greatly the heating element may be an average size or other size that is likely to fit or function properly for a large number distinct electronic devices. In some embodiments, the heating element may be the size (or approximately) the size of the electronic device case. In some embodiments, the heating element may be the size of a portion of the electronic device case. For example, the heating element may be half the size of the electronic device case and may be located on a lower half of the electronic device case. In another example, the heating element may be located in a corner of the electronic device case.

In some embodiments, the heating element includes a heat conductive element. In some embodiments, the heat conductive element is placed within a covering. The covering may be made of various suitable materials conducive to distributing the heat of the heat conductive element in a generally over the area of the heating element. In some embodiments, the heat conductive element is placed between one or more fabrics. The covering or fabrics may be heat resistant or otherwise configured to distribute the heat generated by the heat conductive element. By distributing the heat more generally over the area of the heating element, the heating element may better heat the battery of the electronic device without any localized extreme heat, which could possible damage the battery of the electronic device. In some embodiments, the heat conductive element may be a wire that produces heat. In one example, the heat conductive element may be a resistance wire that resists the flow of electricity and converts the electrical energy into heat.

In some embodiments, the heating element is configured to attach to the electronic device in a location proximate to the location of the battery of the electronic device. In some embodiments, the heating element is integrated into an electronic device case. The electronic device case is configured to attach to the electronic device.

The electronic device case may be a case for a phone, tablet or other handheld computing device, global positioning system (GPS) device, camera, surveying equipment, recording equipment, or other similar mobile device that is powered, at least partially, by a battery within the electronic device. The electronic device case may include software and/or hardware that enables a user to manipulate, manage, monitor, or otherwise control the heating element and/or the heating element's settings.

Embodiments of a method for heating a battery of an electronic device are described. In one embodiment, the method includes monitoring a temperature sensor of a battery of an electronic device, activating a heating element located adjacent to the battery of the electronic device in response to a temperature reading of the temperature sensor below a first predetermined temperature value, and deactivating the heating element in response to a temperature reading above a second predetermined temperature value. The heating element is configured to emit heat to the battery of the electronic device, and the heating element includes a heat conductive element within a covering.

In some embodiments, the electronic device is a mobile phone and the temperature sensor is monitored by an application of the mobile phone. In some embodiments, the method further comprises receiving an input by a user into the application of the mobile phone. In some embodiments, the input may set the first and/or second predetermined temperature values. Some embodiments of the method include and implement the features and functions described herein with regard to the battery heating systems.

FIG. 1 depicts a schematic diagram of one embodiment of a battery heating system 100 for electronic devices. Although the battery heating system 100 is shown and described with certain components and functionality, other embodiments of the battery heating system 100 may include fewer or more components to implement less or more functionality.

The illustrated battery heating system 100 includes an electronic device 102, and a battery 104 that powers the electronic device 102. The illustrated battery heating system 100 also includes a heating element 106 that maintains the temperature of the battery 104. The illustrated battery heating system 100 also includes a thermostat 108, an electronic device case 110, a mobile phone 112 that may control the heating element 106 through use of a battery heating application (app) 114, and a temperature sensor 116.

The electronic device 102 is powered at least partly by the battery 104. Extreme or cold temperatures may adversely affect the life of the battery 104 and ultimately reduce the efficiency and utility of the electronic device 102. In some embodiments the electronic device 102 may be a mobile phone, a GPS device, surveying equipment, recording equipment, or any other battery powered electronic device used in cold temperatures. The battery 104 may be any battery or device comprising an electrochemical cell that converts chemical energy into electrical energy including but not limited to a rechargeable battery, non-rechargeable battery, an alkaline battery, a lithium-ion battery, a nickel-cadmium battery, or any other type of battery. Additionally, the battery 104 may be of any standard or special size including but not limited to D, C, AA, AAA, LR 44, 9-volt, etc.

Some embodiments of the battery heating system 100 include a heating element 106 to maintain the battery 104 at a desired temperature or temperature range. In some embodiments, the heating element 106 is integrated or built into the battery 104. In some embodiments, the battery 104 and the heating element 106 are integrated into the electronic device 102 so as to place the heating element 106 near the battery 104 so as to enable the heating element 106 to maintain the battery 104 within a desired temperature range.

Figure 2:
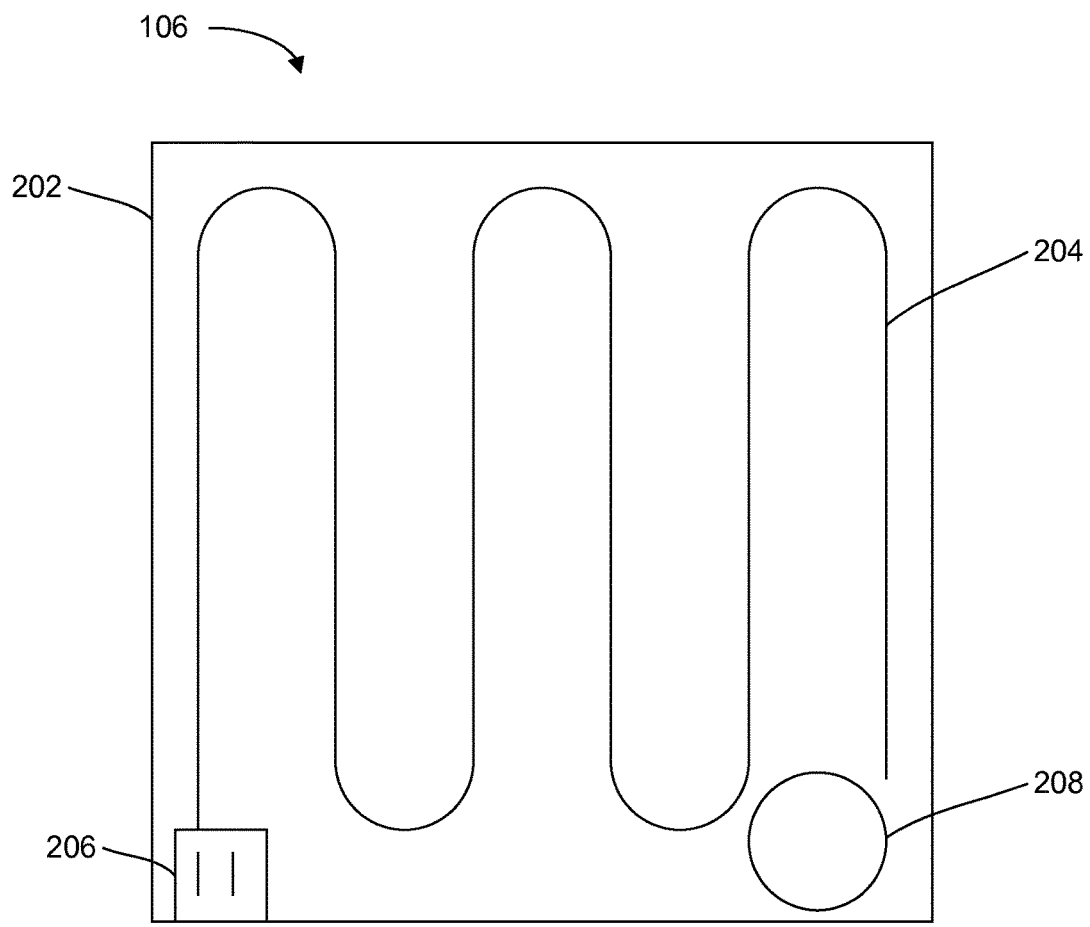
FIG. 2 depicts one embodiment of a heater or heating element for a battery.

In some embodiments, the heating element 106 is connected to the battery 104 of the electronic device 102 and the heating element 106 is powered by the battery 104. In some embodiments the heating element 106 is integrated into the electronic device 102 and functions with and is powered by the battery 104 of the electronic device 102. In some embodiments, the heating element 106 is powered by a separate power source (as is shown in FIG. 2). In some embodiments, the heating element 106 is powered by a separate battery (as is shown in FIG. 2). In some embodiments, the separate battery of the heating element 106 is configured to charge in conjunction with the charging of the battery 104 of the electronic device 102. For example, when a user plugs in the electronic device 102 to charge the battery 104, the separate battery may be simultaneously charged during the charge of the electronic device battery 104.

In some embodiments, the heating element 106 may be various sizes and shapes. The size and shape may vary to better fit or function for a particular size battery 104. In some embodiments, the heating element 106 may be substantially the same size and/or shape as a footprint of the battery 104 of the electronic device 102. In some embodiments, the heating element 106 is approximately the size of the area of the battery 104 of the electronic device 102. By sizing the heating element 106 to an approximate of the size of the area of the battery 104, the heating element 106 may better heat all portions of the battery 104 when the heating element 106 is activated rather than heating a specific portion of the battery 104. In some embodiments, the heating element 106 may be sized to heat a specific portion of the battery 104. As the battery 104 of different electronic devices can vary greatly the heating element 106 may be an average size or other size that is likely to fit or function properly for a large number of distinct electronic devices 102, allowing the production of one heating element 106 that will fit a large number of distinct electronic devices 102.

In some embodiments, the heating element 106 includes a heat conductive element (as is shown in FIG. 2). In some embodiments, the heat conductive element is placed within a covering. In some embodiments, the heat conductive element is placed between one or more fabrics. The covering or fabrics may be heat resistant or otherwise configured to distribute the heat generated by the heat conductive element. By distributing the heat more generally over the area of the heating element 106, the heating element 106 may better heat the battery 104 of the electronic device 102 without any localized extreme heat, which could possible damage the battery 104 of the electronic device 106. In some embodiments, the heat conductive element may be a wire that produces heat. In one example, the heat conductive element may be a resistance wire that resists the flow of electricity and converts the electrical energy into heat.

In some embodiments, the heating element 106 is configured to attach to the electronic device 102 in a location proximate to the location of the battery 104 of the electronic device 102. In some embodiments, the heating element 106 is integrated into the electronic device 102. In some embodiments, the heating element 106 is integrated into an electronic device case 110. The electronic device case 110 is configured to attach to the electronic device 102.

Some embodiments of the battery heating system 100 for electronic devices may include a thermostat 108 or another similar control system capable of sensing the temperature of the battery 104 so that the battery's temperature is maintained at or near a desired temperature. In some embodiments the thermostat 108 is connected to the heating element 106. In some embodiments, the thermostat is connected to a mobile phone 112 or to the electronic device 102. In some embodiments, the thermostat 108 is controlled and manipulated through the electronic device 102. In some embodiments, the thermostat 108 is controlled and manipulated through another device, such as the mobile phone 112 or another computer system remote to the thermostat. The thermostat 108 and the computer system or mobile phone 112 may communicate through bluetooth or another wireless communication technology, or through wired technology. Some embodiments of the battery heating system 100 for electronic devices may include temperature sensor(s) 116. In some embodiments, the temperature sensor(s) may be part of the thermostat 108 or may be separate. In some embodiments, the electronic device 102 may include a temperature sensor 116.

In some embodiments, a battery heating system 100 further includes a temperature sensor 116. The temperature sensor 116 measures a temperature of the battery 104 or the electronic device 102. In some embodiments, the temperature sensor 116 is located in a position adjacent to the battery 104 of the electronic device 102. In some embodiments, the temperature sensor 116 is located on the battery 104 of the electronic device 102. In some embodiments, the temperature sensor 116 is located within the battery 104 of the electronic device 102. The temperature sensor 116 may be placed or located in a variety of positions to better determine an accurate temperature of the battery of the electronic device. In some embodiments, the temperature sensor 116 is placed on the device case 110. Accurately determining the temperature of the battery 104 and the electronic device 102 may help determine when the heating element 106 should be activated and deactivated. The temperature sensor 116 may be any type of temperature sensor that may accurately function in the position on, near, or within the electronic device 102. The temperature sensor 116 may be, but is not limited to, a thermocouple, a resistive temperature device, a thermistor, an infrared radiator, a bimetallic device, a liquid expansion device, a change-of-state sensor, a silicon diode, or another type of temperature sensor.

In some embodiments, the heating element 106 is configured to be activated in response to a temperature reading of a temperature sensor 116 (either in conjunction with the thermostat 108 or separate) below a temperature value. In some embodiments, the temperature value is predetermined. In some embodiments, the predetermined temperature value is input by a user and controllable and adjustable by the user. In some embodiments, the heating element 106 is configured to be deactivated or turned off in response to a temperature reading of a temperature sensor 116 above another temperature value, which can be predetermined and/or set by a user. In this way, a consistent range of acceptable temperatures may be maintained to provide optimum performance of the battery 104 by prolonging battery life in extreme temperatures.

Some embodiments of the battery heating system 100 may include a device case 110. In some embodiments, the battery 104 may not be detachable from the electronic device 102 making it difficult to attach and integrate the heating element 106. In some embodiments, the heating element 106 is integrated with the device case 110 in a position near the battery 104 where the heating element 106 may maintain the temperature of the battery 104.

In some embodiments, the heating element 106 is integrated into the electronic device case 110. In some embodiments, the heating element 106 is configured to attach to the electronic device case 110 in a location proximate to the location of the battery 104 of the electronic device 102 when the device case 110 is attached to the electronic device 102. The device case or electronic device case 110 may be a case for a phone, tablet or other handheld computing device, global positioning system (GPS) device, camera, surveying equipment, recording equipment, or other similar mobile device that is powered, at least partially, by a battery 104 within the electronic device 102. The electronic device case 110 may include software and/or hardware that enables a user to manipulate, manage, monitor, or otherwise control the heating element 106 and/or the heating element's settings. In some embodiments, the heating element 106, the computer device 118, and/or the temperature sensor 116 may in some combination be separate and sit between the device case 110 and the electronic device 102.

Some embodiments of the battery heating system 100 may include a mobile phone 112 or another mobile device, computer system, or computer device 118. In some embodiments, the mobile phone 112 or computer system may utilize a battery heating app 114 to control and monitor the heating element 106, the thermostat 108, the battery 104, and/or the electronic device 102. In some embodiments, the mobile phone 112 is the same device as the electronic device 102. In some embodiments, the mobile phone or computer system 112 is separate from the electronic device 102 and may control and monitor more than one electronic device 102. For example, a user may have many electronic devices 102 with heating elements 106 maintaining the temperatures of the batteries 104 of the devices 102. A mobile phone 112 may monitor and control the heating element 106 for the phone itself as well as a GPS device, a video recording device, an audio recording device, or any other battery powered electronic device.

In some embodiments, the heating element 106 includes a computer device 118. In some embodiments, the computer device 118 is part of the electronic device 102. In some embodiments, the computer device 118 is separate from the heating element 106 and the electronic device 102. In some embodiments, the computer device 118 executes an application that determines the temperature values. In some embodiments, the computer device 118 activates and/or deactivates the heating element 106. In some embodiments, the computer device 118 activates and/or deactivates the heating element 106 in response to an input by a user. In some embodiments, the computer device 118 activates and/or deactivates the heating element 106 in response to a particular temperature reading. In some embodiments, the computer device 118 activates and/or deactivates the heating element 106 in response to a signal from the electronic device 102, which signal may be communicated wirelessly or by another manner to the computer device 118.

FIG. 2 depicts one embodiment of a heater or heating element 106 for a battery 104 of an electronic device 102. The illustrated heating element 106 includes a low voltage/low temperature heat conductive wire 204 within a heat resistant material 202. In some embodiments, the material 202 is a silicon-based material. In some embodiments, the material 202 may be any material capable of transferring heat in a uniform manner from the wire or element 204 to the battery 104. In some embodiments, the wire or element 204 is located between two thin heat resistant fabrics or materials. The illustrated heating element 106 is powered by a battery 208 which may be recharged through a plug-in 206. In some embodiments, the heating element 106 is powered by a rechargeable battery. In some embodiments, the heating element 106 is powered by the battery 104 of the electronic device 102. In some embodiments, the heating element 106 is powered by a non-rechargeable battery. In some embodiments, the heating element 106 is powered by through a plug or adapter 206. In some embodiments, the plug-in or adapter 206 recharges the battery 208. In some embodiments, the plug-in 206 is a female adapter that enables the use of a variety of different power sources such as wall outlet, car adapter, and other such power sources to charge or operate the heating element 106. While the illustrated heating element 106 utilizes a heat conductive wire to produce heat, those skilled in the art may recognize ways to produce and transfer heat to the battery 104, including through chemical reactions, etc.

In some embodiments, the heating element 106 is manufactured to the same size of the battery 104. For example, the heating element 106 may be made to the size of different batteries 104 so as to effectively maintain the temperature of the battery 104 as well as effectively fit within the battery space of the electronic device 102. While FIG. 2 illustrates an electric heating element as the heating element 106, one skilled in the art may recognize alternative heating sources that may perform the function of the heating element 106.

Figure 3:
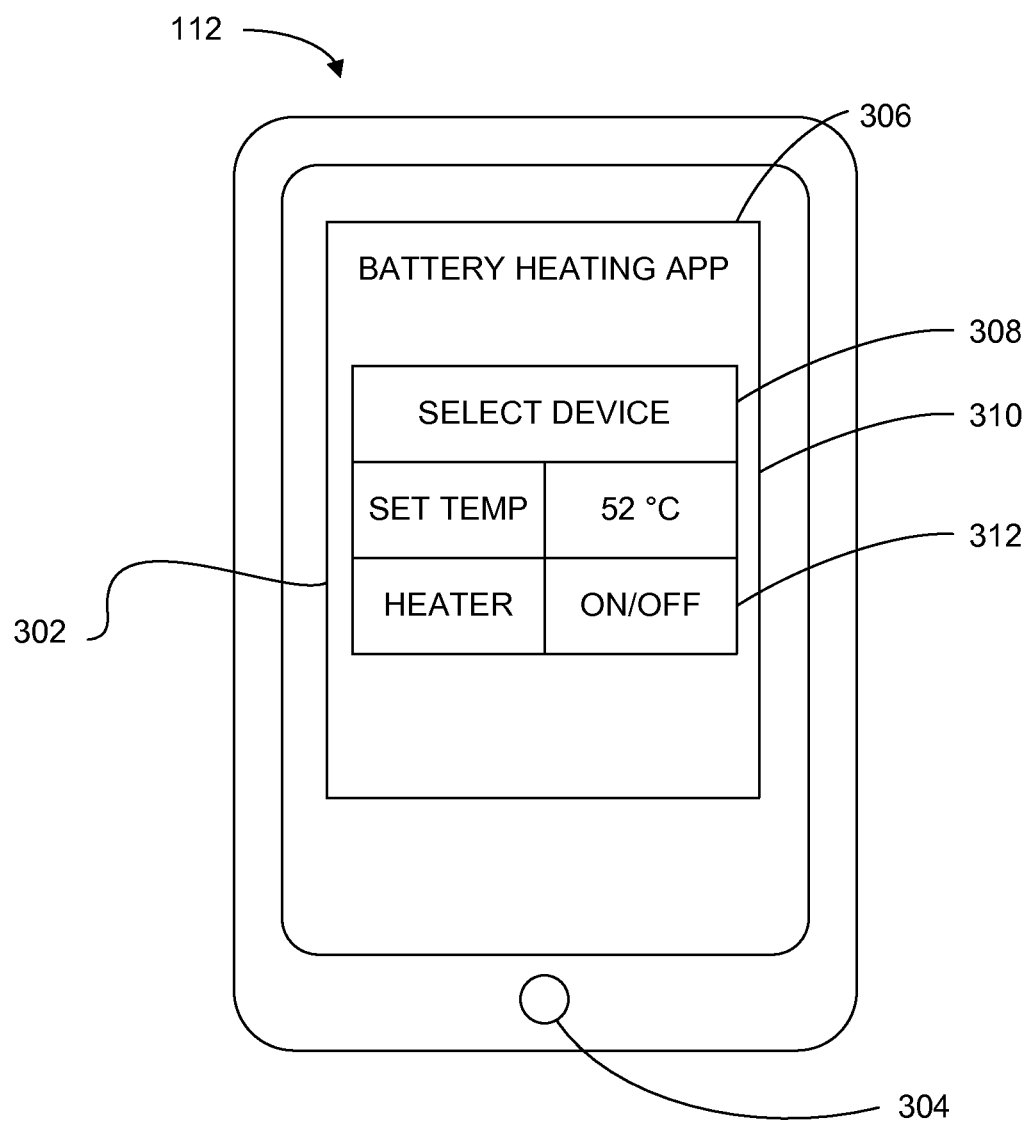
FIG. 3 depicts one embodiment of a mobile device executing an application that controls the heating element showing various settings and controls.

FIG. 3 depicts one embodiment of a mobile device 112 executing an application 114 that controls the heating element 106 showing various settings and controls 308-312. The illustrated mobile device 112 includes a user interface 302 and button 304 for user interaction. The user interface 302 depicts an application 306 for use to control and monitor the heating element 106 and battery 104 of an electronic device 102. In some embodiments, the battery heating app 306 includes setting and controls 308-312. In some embodiments, the app 306 may include a control 308 that designates the electronic device 102 that a user wants to control in the case where more than one electronic device 102 exists. In some embodiments, the app 306 includes a setting 310 controlling the desired temperature of the battery 104. In some embodiments, the app 306 includes a setting 312 to turn the heater or heating element 106 on and off. Some embodiments do not include a thermostat 108 and are manually turned on and off when needed. In some embodiments, the mobile device 112 is also the electronic device 102, where the application 114 is on the electronic device 102 and controlled by the various inputs/outputs of the electronic device 102. In some embodiments, the mobile phone 112 may communicate with the heating elements 106 and control the heating elements 106 of various other electronic devices 102.

Figure 4:
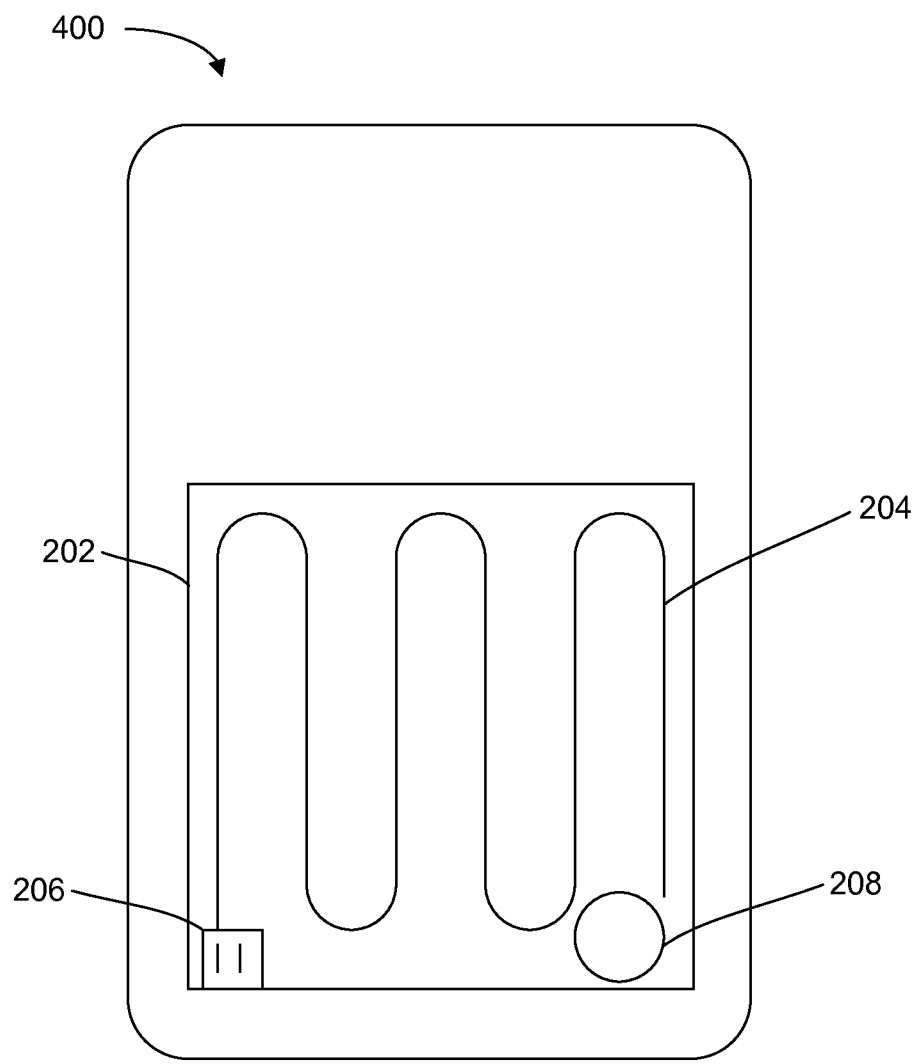
FIG. 4 depicts one embodiment of a mobile device case with a heating element attached.

FIG. 4 depicts one embodiment of an electronic device case 400 with a heating element 106 similar to the heating element 106 of FIG. 2 integrated into the device case 400. In some embodiments, the battery 104 of the electronic device 102 is integrated into the electronic device 102 and is not detachable. This may make it difficult to integrate and attach the heating element 106 near the battery 104. In such instances and in some embodiments, the heating element 106 may be integrated and attached to a device case 400. For example, many mobile phones may utilize cases to protect the device in case of a fall or other sudden impact on the device. In some embodiments, the heating element 106 is sewn into the case 400 in an area proximate to where the battery 104 would be located. In some embodiments, the case 400 may be waterproof so as to keep the device 102 and the battery 104 dry and maintained at a desired temperature.

Figure 5:
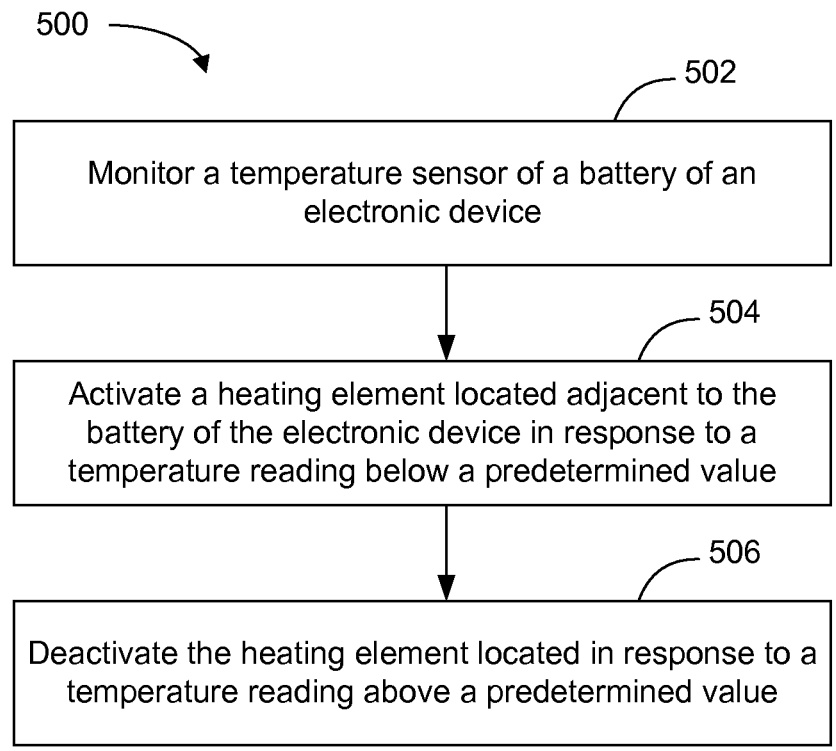
FIG. 5 depicts a flow chart diagram of an embodiment of a method for heating a battery of an electronic device.

FIG. 5 depicts a flow chart diagram of an embodiment of a method for heating a battery of an electronic device 500. Although the method 500 is described in conjunction with the systems and devices of FIGS. 1-4, embodiments of the method for heating a battery of an electronic device 500 may be implemented with other types of systems and devices.

At 502, a temperature sensor 116 of a battery 104 of an electronic device 102 is monitored. The temperature sensor 116 may be located and function as is described more fully in the various embodiments above. At 504, a heating element 106 located adjacent to the battery 104 of the electronic device 102 is activated in response to a temperature reading below a predetermined value. The heating element 106 may be located and may function consistent with the various embodiments described more fully above. At 506, the heating element 106 is deactivated in response to a temperature reading above another predetermined value. The method then ends.

In some embodiments, the electronic device 102 is a mobile phone 112 and the temperature sensor 116 is monitored by an application 114 of the mobile phone 112. In some embodiments, the method further comprises receiving an input by a user into the application 114 of the mobile phone 112. In some embodiments, the input may set the first and/or second predetermined temperature values. Some embodiments of the method include and implement the features and functions described herein with regard to the embodiments of the battery heating systems.

Other embodiments of the method for heating a battery of an electronic device 500 may include fewer or more steps to implement less or more functionality. Other embodiments of the method for heating a battery of an electronic device 500 may include some or all the operations and steps as described above in conjunction with FIGS. 1-4 in various combinations and are not expounded upon for the sake of brevity.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A battery heating system for electronic devices, the battery heating system comprising:
    a mobile phone;
    a mobile phone battery, wherein the mobile phone battery powers the mobile phone;
    a heating element in thermal communication with the mobile phone battery, the heating element adjustable to generate temperatures within a range of temperatures; and
    a downloadable application on the mobile phone, the downloadable application configured to:
        receive user inputs on the mobile phone that set one or more adjustable temperatures for one or more batteries, and
        in response to receiving the user inputs, manage and control the heating element to generate heat within the range of temperatures and transfer the generated heat to the mobile phone battery to maintain an adjustable temperature for the mobile phone battery,
    wherein:
        the heating element is configured to be activated and deactivated by the downloadable application,
        the heating element comprises a heat conductive element within a covering to transfer heat to the mobile phone battery, and
        the covering is disposed between the heat conductive element and the mobile phone battery.

2. The system of claim 1, wherein the battery heating system further comprises a temperature sensor located adjacent to the mobile phone battery, wherein the temperature sensor measures a temperature of the mobile phone battery and wherein the heating element is configured to be activated in response to a temperature reading of the temperature sensor being below a predetermined temperature value.

3. The system of claim 1, wherein the heating element is powered by the mobile phone battery.

4. The system of claim 1, wherein the heating element comprises a power source, wherein the power source is a second battery.

5. The system of claim 1, wherein the heating element is approximately the size of the area of the mobile phone battery.

6. The system of claim 1, wherein the battery heating system further comprises a mobile phone case, wherein the heating element is integrated into the mobile phone case.

7. The system of claim 1, wherein the heating element is configured to attach to the mobile phone.

8. The system of claim 1, wherein:
    the battery heating system further comprises a case configured to hold the mobile phone and at least one additional electronic device;
    each additional electronic device comprises an electronic device battery;
    the heating element is in thermal communication with each electronic device battery; and
    the downloadable application is further configured to control the heating element to selectably transfer the generated heat to one of the mobile phone battery and an electronic device battery to maintain an adjustable temperature for the one of the mobile phone battery and the electronic device battery in response to receiving the user inputs.

9. A battery heating system for electronic devices, the battery heating system comprising:
    an electronic device case, wherein the electronic device case is configured to attach to one or more electronic devices; and
    a heating element integrated into the electronic device case and configured to adjustably generate heat to temperatures within a range of temperatures,
    wherein:
        the heating element is configured to transfer the adjustably generated heat to a battery of the one or more electronic devices via a heat conductive element within a covering disposed between the heat conductive element and the battery,
        the heating element is configured to be activated and deactivated by a downloadable application on the electronic device, and
        the downloadable application is configured to:

receive user inputs on the mobile phone that set one or more adjustable temperatures within the range of temperatures for the battery, and in response to receiving the user inputs, control the heating element to generate heart within the range of temperatures and transfer the generated heat to maintain the one or more adjustable temperatures.

10. The system of claim 9, wherein the electronic device is a mobile phone and the electronic device case is a mobile phone case.

11. The system of claim 9, wherein the system further comprises a temperature sensor, wherein the temperature sensor is integrated into the electronic device case, wherein the temperature sensor is located in a position configured to be next to the battery of the electronic device when the electronic device case is attached to the electronic device.

12. The system of claim 9, wherein the heating element is configured to be powered by the battery of the electronic device.

13. The system of claim 9, wherein the heating element comprises a battery power source.

14. The system of claim 9, wherein the downloadable application is further configured to monitor the heating element to ensure that the one or more adjustable temperatures are maintained during operation of the electronic device.

15. The system of claim 9, wherein:

the electronic device case is configured to attach to a first electronic device and a second electronic device;

the heating element is in thermal communication with a first battery of the first electronic device and a second battery of the second electronic device when the first electronic device and the second electronic device are attached to the electronic device case; and the downloadable application is further configured to, in response to receiving the user inputs, selectably transfer the generated heat to one of the first electronic device battery and the second electronic device battery to maintain an adjustable temperature in the one of the first electronic device battery and the second electronic device battery.

16. The system of claim 15, wherein one of:
the first electronic device and the second electronic device are mobile phones; and
the first electronic device is a mobile phone and the second electronic device is a global positioning system (GPS) device.

17. The system of claim 15, wherein one of:
the first battery and the second battery are a same type of battery; and
the first battery and the second battery are different types of batteries.

18. A method for heating a battery of an electronic device, the method comprising: receiving, by a computing device executing a downloadable application on the electronic device, a user input that sets an adjustable temperature within a range of temperatures for a battery of the electronic device; in response to receiving the user input on the electronic device, controlling a heating element thermally coupled to the battery to generate heat within the range of temperatures to maintain the set adjustable temperature; monitoring, via a temperature sensor coupled to the battery, a temperature of the battery; activating the heating element to transfer heat to the battery in response to a first temperature reading of the temperature sensor being below a first predetermined temperature value for the battery; and deactivating the heating element to cease transferring heat to the battery in response to a second temperature reading of the temperature reading being above a second predetermined temperature value for the battery, wherein: the heating element is adjustable to generate temperatures within the range of temperatures, the heating element is controlled by the downloadable application to transfer and cease transferring heat to the battery, and the temperature sensor is monitored by the downloadable application to maintain the set adjustable temperature for the battery.

19. The method of claim 18, wherein:
the electronic device is a mobile phone; and
the user input further sets at least one of the first predetermined temperature value and the second predetermined temperature value.

20. The method of claim 18, wherein at least one of:
activating the heating element comprises manually activating the heating element;
and
deactivating the heating element comprises manually deactivating the heating element.

* * * * *